United States Patent
Chiang

(10) Patent No.: US 11,044,438 B2
(45) Date of Patent: Jun. 22, 2021

(54) PROJECTION DISPLAY APPARATUS AND DISPLAY METHOD

(71) Applicant: DELTA ELECTRONICS, INC., Taoyuan (TW)

(72) Inventor: Fu-Jen Chiang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 133 days.

(21) Appl. No.: 16/455,729

(22) Filed: Jun. 27, 2019

(65) Prior Publication Data
US 2020/0275051 A1    Aug. 27, 2020

(30) Foreign Application Priority Data

Feb. 22, 2019    (CN) .......................... 201910133086.8

(51) Int. Cl.
G06K 9/00       (2006.01)
H04N 7/01       (2006.01)
G06T 7/20       (2017.01)
H04N 5/351      (2011.01)
H04N 5/74       (2006.01)

(52) U.S. Cl.
CPC .............. H04N 7/014 (2013.01); G06T 7/20 (2013.01); H04N 5/351 (2013.01); H04N 5/7408 (2013.01)

(58) Field of Classification Search
CPC ... G09G 2340/0407; G09G 2340/0414; G09G 2340/0421; G09G 2340/0435; G09G 2340/16; G09G 3/002; G09G 3/007; G09G 5/391; H04N 5/351; H04N 5/7408; H04N 7/014; H04N 9/3188
See application file for complete search history.

(56) References Cited

U.S. PATENT DOCUMENTS

| | | | |
|---|---|---|---|
| 2009/0080789 A1* | 3/2009 | Shoji ................... | H04N 9/3188 382/254 |
| 2011/0037894 A1 | 2/2011 | Sbaiz | |
| 2017/0019648 A1* | 1/2017 | Yamaguchi .......... | H04N 7/0132 |

FOREIGN PATENT DOCUMENTS

| | | |
|---|---|---|
| CN | 103108148 A | 5/2013 |
| CN | 103813180 A | 5/2014 |
| CN | 107801009 A | 3/2018 |
| TW | 201818346 A | 5/2018 |

* cited by examiner

*Primary Examiner* — Avinash Yentrapati
(74) *Attorney, Agent, or Firm* — CKC & Partners Co., LLC

(57) ABSTRACT

A projection display apparatus includes a processing circuit and an image projection display device. The processing circuit is configured to perform a dynamic motion compensation based on two successive first frame and second frame in a first video signal, in order to generate a complement frame between the first frame and the second frame. The processing circuit is further configured to combine the first frame and the complement frame into a third frame, and to decompose the third frame to generate a plurality of fourth frames and to output the fourth frames as a second video signal. A resolution of the first video signal is higher than a resolution of the second video signal. The image projection display device is configured to project and display the second video signal, in which the imaging device has an original resolution equal to the resolution of the second video signal.

12 Claims, 4 Drawing Sheets

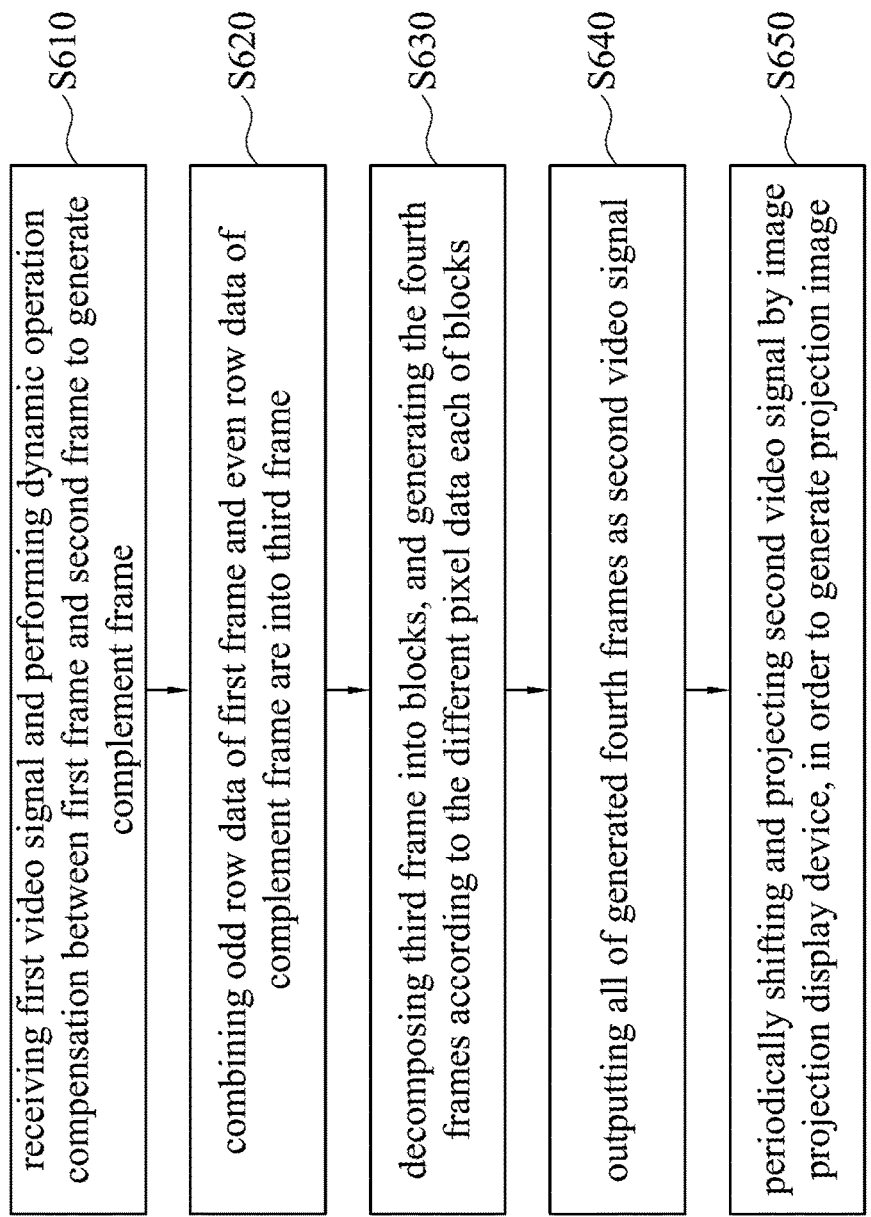

PROJECTION DISPLAY APPARATUS AND DISPLAY METHOD

CROSS-REFERENCE TO RELATED APPLICATION

This application claims priority to China Application Serial Number 201910133086.8, filed Feb. 22, 2019, which is herein incorporated by reference in its entirety.

BACKGROUND

Technical Field

The present disclosure relates to a projection display apparatus and a display method, and in particular to a projection display apparatus and a display method applied to frame insertion and resolution improvement.

Description of Related Art

An image having a high resolution provides clear detail(s) and high quality of viewing, and is thus helpful for improving the user experience and many applications. Many video signals have been developed to have a resolution of 4K (3840×2160), even reaching a resolution of 8K (7680×4320). For now, a general projection display apparatus lacks a projection display component corresponding to the resolution of 8K apparatus. Therefore, the resolution of 8K is not supported by current projection display apparatus.

SUMMARY

An aspect of the present disclosure relates to a projection display apparatus. The projection display apparatus includes a processing circuit and an image projection display device. The processing circuit is configured to perform a dynamic operation compensation according to a first frame and second frame in a first video signal to generate a complement frame between the first frame and the second frame, and to combine the first frame and the complement frame into a third frame, in which the first frame and the second frame are continuous frames, and the processing circuit is further configured to decompose the third frame to generate a plurality of fourth frames, and to output the plurality of fourth frames as a second video signal, and a resolution of the first video signal is higher than a resolution of the second video signal. The image projection display device is configured to project and display the second video signal, in which the image projection display device has an original resolution equal to the resolution of the second video signal.

An aspect of the present disclosure relates to a display method, and the display method includes the following operations: performing a dynamic operation compensation on a first frame and a second frame in a first video signal to generate a complement frame between the first frame and the second frame, and combining the first frame and the complement frame are a third frame, in which the first frame and the second frame are continuous frames; decomposing the third frame to generate a plurality of fourth frames, and outputting the plurality of fourth frames as a second video signal, in which a resolution of the first video signal is higher than a resolution of the second video signal; and displaying the second video signal by an image projection display device.

As described above, the projection display apparatus and the display method provided by the embodiments of the present disclosure can generate a higher resolution image by using a projection apparatus that has lower original resolution.

BRIEF DESCRIPTION OF THE DRAWINGS

FIG. 6 shows a flow chart of a display method according to some embodiments of the present disclosure.

DETAILED DESCRIPTION

The terms used in this specification generally have their ordinary meanings in the art. The above vocabulary is defined in the commonly used dictionary, and any examples of the use of the vocabulary discussed herein are included in the description of the specification, and are not intended to limit the scope and meaning of the disclosure. Likewise, the disclosure is not limited to various embodiments given in this specification.

The terms "comprises", "includes", etc., as used herein, are all open terms, meaning "including but not limited to". Further, "and/or" as used herein includes any one or combination of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

In order to explain a display method 600 of FIG. 6, various related terms or elements will be sequentially described with reference to FIGS. 1 to 5.

Figure 1:
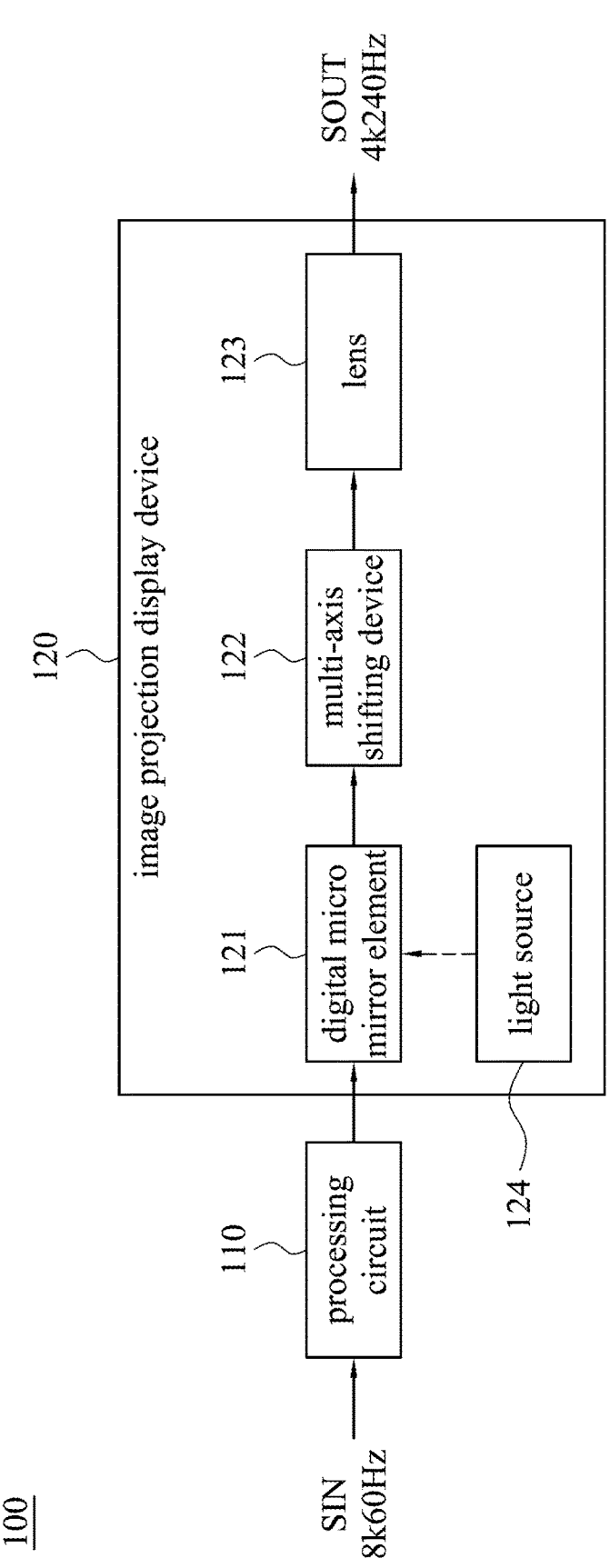
FIG. 1 shows a schematic diagram of a projection display apparatus according to some embodiments of the present disclosure.

Referring to FIG. 1, FIG. 1 is a schematic diagram of a projection display apparatus 100 according to some embodiments of the present disclosure. In some embodiments, the projection display apparatus 100 is configured to receive a video signal having high resolution, and to use an image projection device which has a lower original resolution to generate an image of the video signal, and to make the image have the aforementioned high resolution equivalently.

For example, in some applications, the projection display apparatus 100 is configured to receive a first video signal SIN having a specification of 8K60 Hz. The projection display apparatus 100 further employs an image projection display device 120 having a resolution of 4K, in order to generate the image (i.e., second video signal SOUT) that is able to provide an effect of 8K resolution effect for human eye, in which the real output specification of the image is 4K240 Hz. In different applications, the projection display apparatus 100 may be a digital television, a digital micro mirror, a home projector, a professional projector, etc.

In some embodiments, the projection display apparatus 100 includes a processing circuit 110 and the image projection display device 120. In some embodiments, the processing circuit 110 is configured to perform operation(s) of a display method 600 described below, in order to generate a projection image.

In some embodiments, the processing circuit 110 may include image processing circuit(s), which may include, for example, a dynamic blur suppression circuit (not shown), an image processing circuit (not shown), a color management circuit (not shown), etc. The processing circuit 110 also includes at least one control circuit (not shown) that is configured to control operation(s) and timing of the above image processing circuits. The dynamic blur suppression circuit can perform dynamic estimation or compensation (for example, a dynamic operation compensation described later) according to the first video signal SIN to improve the sharpness or smoothness of the image. The image processing circuit is configured to perform operations of FIG. 3 and/or FIG. 4 described later. The color management circuit is configured to perform operations (e.g., color separation) according to operational requirements.

In some embodiments, the processing circuit 110 can be a combination of processor and memory, in which the functions of the image processing circuits (e.g., dynamic blur suppression circuit, image processing circuit, color management circuit, etc.) may be implemented with at least one computer program code and stored in the memory for use by the processor.

In some embodiments, the processor is a central processing unit (CPU), an application-specific integrated circuit (ASIC), a multi-processor, a decentralized processing system, or a suitable processor.

In some embodiments, the memory is a non-transitory computer readable medium. In some embodiments, the computer readable medium is an electrical, magnetic, optical, infrared, and/or semiconductor system (or apparatus or device). For example, non-transitory computer readable medium includes semiconductor or solid state memory, magnetic tape, removable computer diskettes, random access memory (RAM), read only memory (ROM), hard disk and/or optical magnetic dish. In some embodiments, the computer readable medium includes a CD-ROM, a CD-R/W, and/or a digital video disc (DVD).

The above embodiments regarding the processing circuit 110 are given for illustrative purposes, but the present disclosure is not limited thereto. Various circuits or units to implement the processing circuit 110 are within the scope of the present disclosure.

In some embodiments, the image projection display device 120 may include a digital micro mirror element 121, a multi-axis shifting device 122, a lens 123, and a light source 124.

In some embodiments, the digital micro mirror element 121 may include a matrix formed with a plurality of micro mirrors (not shown). With light transmitted by the light source 124, the digital micro mirror element 121 can project the image via the lens 123. In some embodiments, the multi-axis shifting device 122 can be activated by the projection display apparatus 100 according to the resolution of the first video signal SIN.

In some embodiments, the multi-axis shifting device 122 can include two sets of voice coil motors (not shown) and a lens (not shown). One set of voice coils can drive the lens to shift the image projected by the digital micro mirror element 121 along a first axial direction (e.g., a vertical axis). Another set of voice coil motors can drive the lens, in order to shift the image in a second axial direction (e.g., horizontal axis) projected by the digital micro mirror element 121. With the above operation, the resolution of the screen can be equivalently improved. Detailed operation(s) of the shifting will be described later with reference to FIG. 5.

In some embodiments, the image projection display device 120 has an original resolution of 3840×2160 (also known as 4K resolution). In some applications, the resolution of the first video signal SIN received by the processing circuit 110 is higher than the original resolution of the image projection display device 120. For example, the resolution of the first video signal SIN can be 7680×4320 (also referred to as 8K resolution).

In some related approaches, when the resolution of the received video signal is greater than the original resolution of the projection display device, the projection display device can only present the image having the original resolution. Compared with the above approaches, by executing the display method 600, the projection display apparatus 100 of the embodiment of the present disclosure can provide the projection image with high resolution via the image projection display device 120 that has a lower original resolution.

Figure 2:
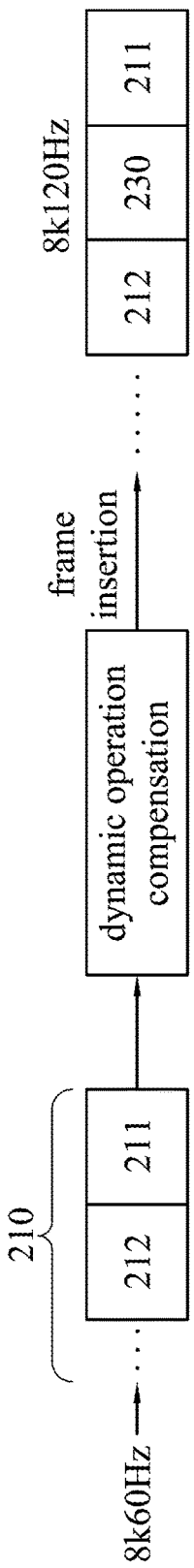
FIG. 2 shows a schematic diagram illustrating an operation of a dynamic operation compensation according to some embodiments of the present disclosure.

FIG. 2 is a schematic diagram illustrating an operation 200 of a dynamic operation compensation according to some embodiments of the present disclosure. As shown in FIG. 2, the specification of a first video signal 210 (i.e., the first video signal SIN in FIG. 1) is 8K60 Hz.

The first video signal 210 includes a plurality of continuous frames, which includes, for example, a first frame 211 and a second frame 212. In some embodiments, the processing circuit 110 performs a dynamic operation compensation according to the first frame 211 and the second frame 212 to generate a complement frame 230, and inserts the complement frame 230 between the first frame 211 and the second frame 212. The aforementioned first frame 211 and second frame 212 may be any two continuous frames in the first video signal 210. For example, the processing circuit 110 performs the dynamic operation compensation according to the second frame 212 and its next frame (not shown) to generate the complement frame, and the complement frame is inserted between the second frame 212 and the aforementioned next frame (not shown). With this analogy, the specification of the processed video signal can be increased to 8K120 Hz. In some embodiments, the above term "continuous" means that two frames are continuous in time, or that two frames are associated with each other based on the encoding, but the present disclosure is not limited thereto.

In some embodiments, the aforementioned dynamic operation compensation is an image processing method of motion estimation and motion compensation (MEMC). In some embodiments, this image processing method includes operations of de-interlacing and/or motion interpolation. The above dynamic operation compensation is given as an example, and the present disclosure is not limited thereto. The various types of dynamic operation compensation are within the scope of this disclosure.

Figure 3:
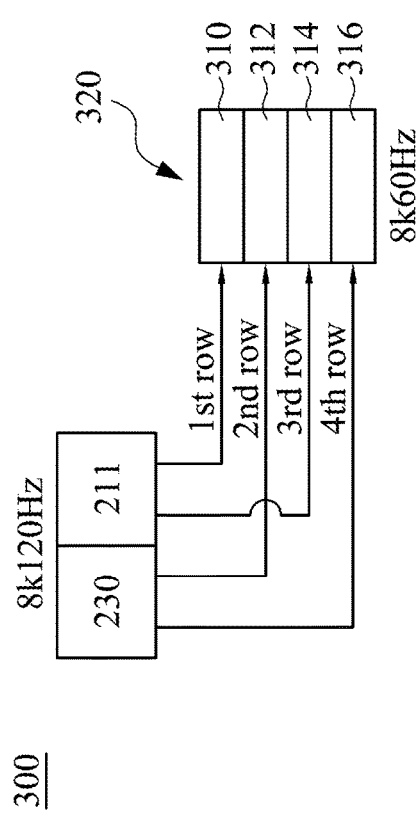
FIG. 3 shows a schematic diagram of an operation of combining a third frame according to some embodiments of the present disclosure.

FIG. 3 is a schematic diagram of an operation 300 of combining the first frame 211 and the complement frame 230 in FIG. 2 according to some embodiments of the present disclosure.

In some embodiments, the image of each of the first frame 211 and/or the complement frame 230 is formed with a plurality of row data, in which the each one of the row data may contain multiple image data values (e.g., pixel values). In some embodiments, the processing circuit 110 is configured to interleave a plurality of odd row data of the first frame 211 with a plurality of even row data of the complement frame 230 to generate the third frame 320.

For example, first row data 310 and second row data 314 of the third frame 320 in FIG. 3 are the first row data and the third row data of the first frame 211, respectively. Second row data 312 and fourth row data 316 of the third frame 320 are the second row data and the fourth row data of the complement frame 230, respectively.

Figure 4:
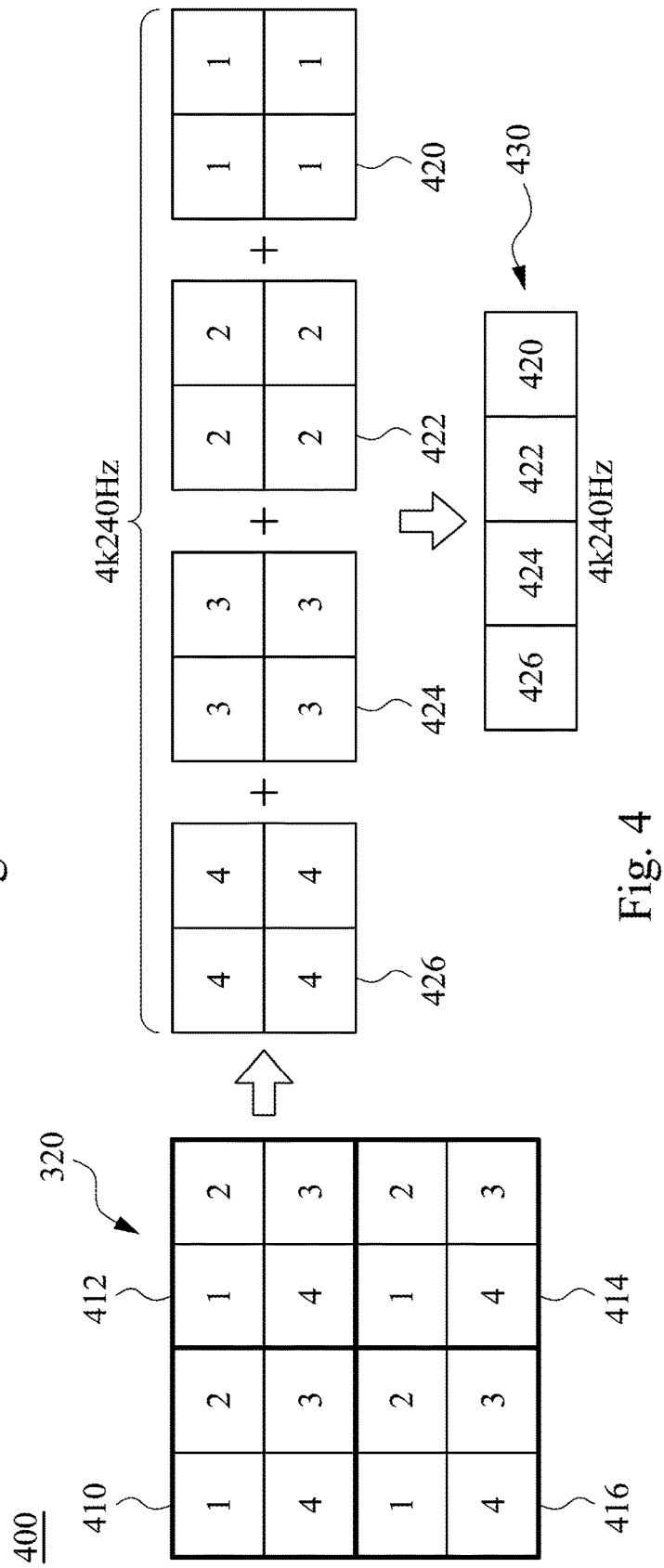
FIG. 4 shows a schematic diagram of an operation of combining a fourth frame according to some embodiments of the present disclosure.

FIG. 4 is a schematic diagram of an operation 400 of combining a fourth frame according to some embodiments of the present disclosure. In some embodiments, the processing circuit 110 can decompose the third frame 320 of FIG. 3 into a plurality of blocks (e.g., blocks 410, 412, 414, and 416), and generate a plurality of fourth frames (e.g., frames 420, 422, 424, and 426) according to different pixel data of each of the blocks.

For example, as shown in FIG. 4, the processing circuit 110 may decompose the plurality of pixel data of third frame 320 into the plurality of blocks 410, 412, 414, and 416. The different pixel data of each of the plurality of blocks 410, 412, 414 and 416 are arranged according to a predetermined direction. For example, as shown in FIG. 4, the above predetermined direction may be a clockwise direction. The plurality of pixel data of each of the blocks 410, 412, 414, and 416 are sequentially arranged in a clockwise direction from an upper left corner of the corresponding block. For example, the plurality of pixel data are sequentially arranged in the upper left corner, the upper right corner, the lower right corner, and the lower left corner of the corresponding block, and are sequentially numbered as the plurality of pixel data 1 to 4.

The processing circuit 110 can generate a corresponding one of the plurality of fourth frames (e.g., frames 420, 422, 424, and 426) according to the corresponding pixel data of each of the plurality of blocks 410, 412, 414 and 416. For example, the processing circuit 110 can combine the pixel data 1 of each of the plurality of blocks 410, 412, 414, and 416 into the fourth frame 420, and combine the pixel data 2 of each of the plurality of blocks 410, 412, 414, and 416 into the fourth frame 422. With this analogy, the processing circuit 110 can combine the plurality of pixel data 3 into the fourth frame 424 and combine the plurality of pixel data 4 into a fourth frame 426. Finally, the processor 110 strings all the generated fourth frames into a second video signal 430.

Explained in another way, taking a frame having a size of 4×4 pixels as an example, the processing circuit 110 sequentially decomposes the 16 pixel points of the third frame 320 into the upper left block 410, the upper right block 412, the lower right block 414, and the lower left block 416. The 4 pixel points of each block are sequentially located at the upper left, upper right, lower right and lower left corners and numbered. The pixel points that have the same number in the four blocks are the combined into new frames (e.g., fourth frames 420, 422, 424, and 426).

In some embodiments, as shown in FIG. 4, each of the third frames 320 can be decomposed into the four fourth frames (e.g., frames 420, 422, 424, and 426). The specification of the second video signal 430 that is formed with all of the fourth frames (e.g., frames 420, 422, 424, and 426), can be equivalently adjusted to 4K240 Hz.

Figure 5:
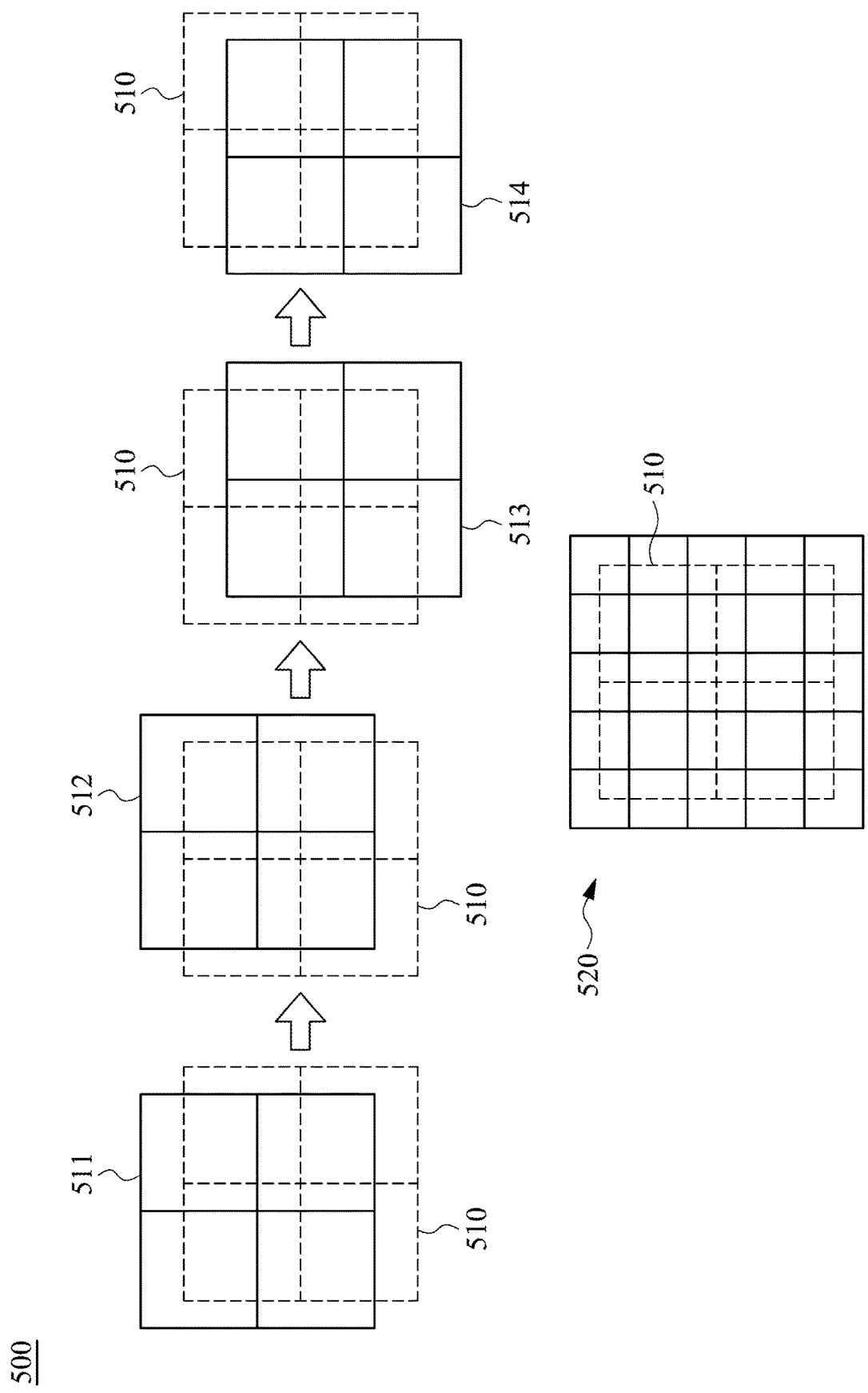
FIG. 5 shows a schematic diagram of periodically shifting and projecting according to some embodiments of the present disclosure.

FIG. 5 is a schematic diagram of an operation 500 of periodically shifting and projecting according to some embodiments of the present disclosure. In some embodiments, the aforementioned multi-axis shifting device 122 can be used to periodically shift and to project the second video signal 430 in a clockwise direction, in order to produce the projection image with higher resolution. Due to the visual persistence of the human eye, the projection image perceived by the user can be equivalently regarded as four overlapped frames that have the 4K resolution. As a result, the resolution of the projection image perceived by the user is equivalently improved to be 8K resolution.

In some embodiments, the original image position 510 of FIG. 5 represents an original position where the original image position projected by the digital micro mirror element 121 through the lens 123 when the multi-axis shifting device 122 is not operating (without shifting).

In some embodiments, the shifting caused by the multi-axis shifting device 122 made according to a predetermined direction (e.g., the aforementioned clockwise direction). For example, the operations shifting and projecting performed by the multi-axis shifting device 122 are to shift the image of the second video signal 430 (i.e., the fourth frame 420) from the original image position 510 to a projection position 511. The images of the second video signal 430 (i.e., the fourth frames 422, 424, and 426) are then sequentially moved to a projection position 512, a projection position 513, and a projection position 514 in a clockwise direction. Because of the visual persistence of the human eye, the final rendered image is the image 520.

FIG. 6 is a flow chart of a display method 600 of the projection display apparatus 100 according to some embodiments of the present disclosure. For ease of understanding, the display method 600 will be described with reference to the aforementioned projection display apparatus 100 and operations in the FIGS. 2 to 5.

In operation S610, the first video signal 210 is received and the dynamic operation compensation between the first frame 211 and the second frame 212 is performed to generate a complement frame 230.

The operation S610 can be understood with reference to the operation 200 of FIG. 2, and thus the description will not be repeated. In some embodiments, via the dynamic operation compensation, a new frame is inserted in every two consecutive image of the first video signal 210, in order to improve the continuity of the dynamic image. If frames per second of the video are more, the smoothness of the rendered dynamic image is better.

In operation S620, the plurality of odd row data of the first frame 211 and the even row data of the complement frame 230 are combined into the third frame 320.

The operation S620 can be understood with reference to the operation 300 of FIG. 3, and thus the description will not be repeated here. In some embodiments, the processing circuit 110 generates a third frame 320 by utilizing odd data in the first frame 211 and even row data in the complement frame 230, in order to extend the effect of the image continuity enhanced by the operation 200 of the previous dynamic operation compensation.

In operation S630, the third frame 320 is decomposed into the plurality of blocks 410, 412, 414 and 416, and the fourth frames 420, 422, 424, and 426 are generated according to the different pixel data 1-4 of each of the plurality of blocks 410, 412, 414 and 416. The operation S630 can be understood with reference to FIG. 4, and thus the description will not be repeated here.

In operation S640, all of the generated fourth frames 410, 412, 414 and 416 are outputted as the second video signal 430.

In operation S650, the second video signal 430 is periodically shifted and projected by the image projection display device 120, in order to generate the projection image.

In some embodiments, the operation of periodically shifting and projecting is to overlap the fast shifting projection of images with each other to form a single image by utilizing the visual persistence characteristics of the human eye, resulting in an effect of increasing the resolution.

For example, as shown in FIGS. 4 and 5, the second video signal 430 includes four fourth frames. The image projection display device 120 periodically shifts and projects the second video signal 430, and the four fourth frames are overlapped with each other and shown as one image with high resolution due to the visual persistence of the human eye.

In some embodiments, if the maximum resolution provided by the current projection display apparatus 100 is 4K, the resolution of the image can be increased to 8K with the above operation(s) and processing(s).

In the above specifications of the video signal, the 4K resolution refers to a level at which the horizontal resolution of the display apparatus or display content reaches four thousand pixels, and the vertical resolution reaches two thousand pixels. The length and width of 4K videos are about 4096×2160 or 3840×2160. The length and width of 8K videos are about 7680×4320. The total pixel size of the 8K specification is four times higher than the total pixel size of the 4K specification.

In the above video signal specification, 60 Hz (hertz) in 4K60 Hz represents the frame rate, i.e., a number of frames (images) are displayed per second. If more frames are displayed per second, the video will be smoother.

Various values of the resolution and/or frame rate mentioned in the above various embodiments are used for the examples, and the present disclosure is not limited thereto. Various resolutions and/or frame rates are within the scope of this disclosure.

The multiple operations in the above control method 600 are only examples. It is not limited to be performed in the order in this example. Various operations of the display method 600 may be appropriately added, replaced, omitted, or performed in a different order, without departing from the operation and scope of the embodiments of the present disclosure.

As described above, the projection display apparatus and the display method provided by the embodiments of the present disclosure can generate a higher resolution image by using a projection apparatus that supports lower native resolution.

Although the present disclosure has been disclosed in the above embodiments, but it is not limited thereto. Anyone who is familiar with this skill can make various changes and refinements without departing from the spirit and scope of this disclosure. Therefore, the scope of protection of this disclosure is subject to the definition of the scope of the patent application attached.

What is claimed is:

1. A projection display apparatus, comprising:
   a processing circuit configured to perform a dynamic operation compensation according to a first frame and second frame in a first video signal to generate a complement frame between the first frame and the second frame, and to combine the first frame and the complement frame into a third frame,
   wherein the first frame and the second frame are continuous frames, and the processing circuit is further configured to decompose the third frame to generate a plurality of fourth frames, and to output the plurality of fourth frames as a second video signal, and a resolution of the first video signal is higher than a resolution of the second video signal; and
   an image projection display device configured to project and display the second video signal, wherein the image projection display device has an original resolution equal to the resolution of the second video signal.

2. The projection display apparatus of claim 1, wherein the processing circuit is further configured to decompose the third frame into a plurality of blocks, and to generate the plurality of fourth frames according to different pixel data in each of the plurality of blocks.

3. The projection display apparatus of claim 2, wherein the different pixel data in each of the plurality of blocks are arranged in a clockwise direction.

4. The projection display apparatus of claim 2, wherein a first one of the plurality of fourth frames is generated according to a first pixel data in each of the plurality of blocks,
   a second one of the plurality of fourth frames is generated according to a second pixel data in each of the plurality of blocks,
   a third one of the plurality of fourth frames is generated according to a third pixel data in each of the plurality of blocks, and
   a fourth one of the plurality of fourth frames is generated according to a fourth pixel data in each of the plurality of blocks.

5. The projection display apparatus of claim 1, wherein the processing circuit is configured to interleave a plurality of odd row data of the first frame and a plurality of even row data of the complement frame to generate the third frame.

6. The projection display apparatus of claim 1, wherein the image projection display device further comprises:
   a multi-axis shifting device configured to periodically shift and project the second video signal to generate a projection image.

7. A display method comprising:
   performing a dynamic operation compensation on a first frame and a second frame in a first video signal to generate a complement frame between the first frame and the second frame, and combining the first frame and the complement frame are a third frame, wherein the first frame and the second frame are continuous frames;
   decomposing the third frame to generate a plurality of fourth frames, and outputting the plurality of fourth frames as a second video signal, wherein a resolution of the first video signal is higher than a resolution of the second video signal; and
   displaying the second video signal by an image projection display device.

8. The display method of claim 7, wherein the third frame is formed with a plurality of odd row data of the first frame and a plurality of even row data of the complement frame that are interleaved with each other.

9. The display method of claim 7, wherein the third frame is decomposed into a plurality of blocks, and the plurality of fourth frames are generated according to different pixel data in each of the plurality of blocks.

10. The display method of claim 9, wherein the different pixel data in each of the plurality of blocks are arranged in a clockwise direction.

11. The display method of claim 9, wherein a first one of the plurality of fourth frames is generated according to a first pixel data in each of the plurality of blocks,
   a second one of the plurality of fourth frames is generated according to a second pixel data in each of the plurality of blocks,
   a third one of the plurality of fourth frames is generated according to a third pixel data in each of the plurality of blocks, and
   a fourth one of the plurality of fourth frames is generated according to a fourth pixel data in each of the plurality of blocks.

12. The display method of claim 7, wherein the image projection display device further comprises a multi-axis shifting device configured to periodically shift and project the second video signal to generate a projection image.

* * * * *